June 8, 1965  R. L. COLLINS  3,188,557
NUCLEAR MAGNETIC RESONANCE SWITCHING CIRCUITRY
Filed April 13, 1962

INVENTOR.
R. L. COLLINS
BY Young & Quigg
ATTORNEYS

United States Patent Office 3,188,557
Patented June 8, 1965

3,188,557
NUCLEAR MAGNETIC RESONANCE
SWITCHING CIRCUITRY
Russell L. Collins, Bartlesville, Okla., assignor to Phillips
Petroleum Company, a corporation of Delaware
Filed Apr. 13, 1962, Ser. No. 187,262
3 Claims. (Cl. 324—.5)

This invention relates to the detection of materials by means of nuclear magnetic resonance measurements.

Valuable information can often be obtained concerning formations intersected by a well bore by means of nuclear magnetic resonance measurements. It is common practice to impress on materials in the formation a temporary magnetic field which is disposed at an angle to the magnetic field of the earth. This results in the nuclei of the atoms in any liquid present in the formation being aligned with the impressed magnetic field. The magnetic field is then removed rather abruptly which results in the nuclei of the atoms in the liquid precessing for a period of time. This precession dies out over a period of time which depends in part on the nature of the material in which the nuclei are found. The precession of the nuclei can be measured in terms of voltages introduced in a coil positioned in the bore hole adjacent the formation. Since the relaxation times differ for water and oil, this nuclear magnetic resonance measurement can be employed to distinguish between water and oil in formations surrounding the well bore.

One of the difficulties encountered in well logging procedures of this type results from the fact that the magnetic field must be removed rather abruptly. The required rate of destruction of the magnetic field generally must be such that some 90 to 95 percent of the field is dissipated within a few milliseconds. The remainder of the magnetic field should be destroyed even more rapidly. In accordance with the present invention, a simple electrical circuit is provided which is capable of permitting a magnetic field to be dissipated in the optimum fashion for use in nuclear magnetic resonance measurements. This is accomplished by connecting a Zener diode in parallel with the coil that establishes the magnetic field. This type of diode, which can be a silicon junction diode, has a back resistance which may exceed 10,000 megohms at moderate back voltages. However, a sharp breakdown in this back resistance occurs at a particular voltage which is generally referred to as the Zener voltage. When the current source is removed from the coil that establishes the magnetic field, the initial voltage across the Zener diode is such as to break it down so that conduction takes place. This results in a rather rapid decay of the magnetic field. When the voltage across the diode has been reduced to a sufficiently small value that the diode is no longer broken down, conduction threrethrough is terminated with the result that the magnetic field decays even more rapidly. This is due to the change in the time constant L/R, which approaches zero when the diode no longer conducts.

Accordingly, it is an object of this invention to provide improved apparatus for use in detecting materials by means of nuclear magnetic resonance measurements.

Another object is to provide electrical circuits for controlling the decay of magnetic fields established by currents flowing through coils.

Another object is to provide novel apparatus for use in logging wells by nuclear magnetic resonance measurements.

Other objects, advantages and features of the invention should become apparent from the following detailed description, taken in conjunction with the accompanying drawing in which.

Figure 1:
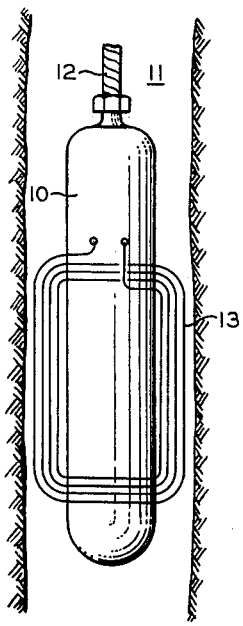
FIGURE 1 is a schematic representation of nuclear magnetic resonance well logging equipment.

Referring now to the drawing in detail and to FIGURE 1 in particular, there is shown a housing 10 which is adapted to be lowered into a well bore 11 by means of a cable 12. Housing 10 is formed of a non-magnetic material such as brass. A coil 13 is carried by housing 10 so that the passage of current through the coil results in a magnetic field being established in the surrounding formation at an angle to the magnetic field of the earth. It is preferred that coil 13 be positioned so that the magnetic field established thereby is generally perpendicular to the magnetic field of the earth. Coil 13 is illustrated schematically in FIGURE 1. However, this coil can be positioned against the well bore wall by apparatus such as is described in U.S. Patent 2,838,732. Cable 12 contains a plurality of electrical leads, not shown, which extend from housing 10 to the surface of the earth. A part of the electrical equipment, described hereinafter, which is connected to coil 13 is contained within housing 10.

Figure 2:
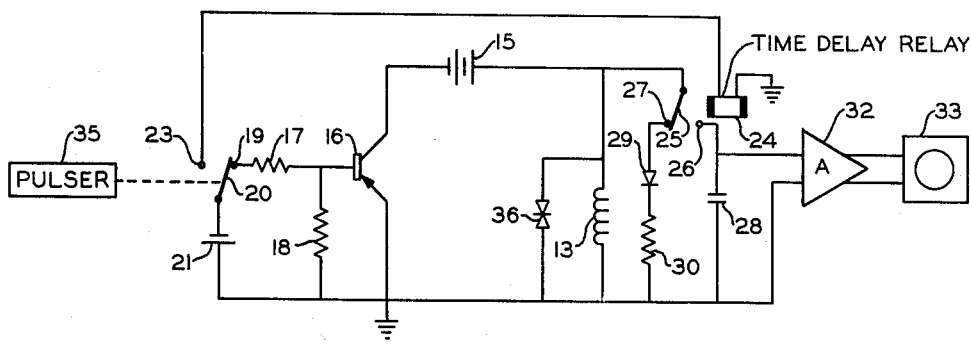
FIGURE 2 is a schematic drawing of the electrical circuit associated with the apparatus of FIGURE 1.

As illustrated in FIGURE 2, one terminal of coil 13 is connected to the positive terminal of a voltage source 15. The second terminal of coil 13 is connected to ground. The negative terminal of voltage source 15 is connected to the collector of a transistor 16. The emitter of transistor 16 is connected to ground. The base of transistor 16 is connected through resistors 17 and 18 to a terminal 19 and to ground, respectively. Terminal 19 is adapted to be engaged by a switch 20 which is connected to the negative terminal of a second voltage source 21. The positive terminal of voltage source 21 is connected to ground. When switch 20 engages terminal 19, conduction takes place through transistor 16 such that current flows from voltage source 15 through coil 13. This establishes the magnetic field in the formations adjacent housing 10.

Switch 20 is also adapted to engage a second terminal 23 which is connected to the first terminal of a coil 24 of a time delay relay. The second terminal of coil 24 is connected to ground. When relay coil 24 is energized by switch 20 being moved into engagement with terminal 23, switch 25 engages a terminal 26. In the absence of the relay coil being energized, switch 25 engages a terminal 27. Switch 25 is connected to the positive terminal of voltage source 15. A capacitor 28 is connected between terminal 26 and ground. A Zener diode 29 and a resistor 30 are connected in series relationship with one another between terminal 27 and ground. The input terminals of an implifier 32 are connected across capacitor 28. The output terminals of amplifier 32 are connected to a meter 33, such as an oscilloscope.

Figure 3:
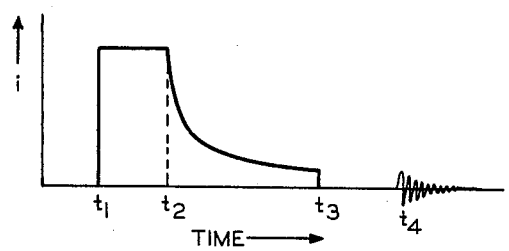
FIGURE 3 is a graphical representation of the operation of the circuit of FIGURE 2.

In the operation of the well logging apparatus of this invention, switch 20 is first moved into engagement with terminal 19 such that current is applied to coil 13. This establishes a magnetic field in the formation. FIGURE 3 is a graphical representation of the flow of current through coil 13 as a function of time. The movement of switch 20 into engagement with terminal 19 occurs at time $t_1$. After the magnetic field has been established, switch 20 is moved into engagement with terminal 23 at time $t_2$. This extinguishes current flow through transistor 16 so that current is no longer supplied to coil 13 from voltage source 15. At the same time, relay coil 24 is energized. However, this relay has a time delay, which can be of the order of 20 milliseconds, for example, which delays the movement of switch 25 into engagement with terminal 26. The voltage applied across Zener diode 29 at this time is sufficient to break down the diode such that current flows through resistor 30 to ground to dissipate the current induced in coil 13. The time constant L/R is relatively large due to the small resistance of resistor 30. Of course, this time constant can be varied by changing the value of resistor 30. The decay of current through coil 13 is shown in FIGURE 3 between times $t_2$ and $t_3$, the voltage across the Zener diode is reduced to such a value that the diode is no longer broken down. This results in the rapid decay of the remainder of the current, as shown in FIGURE 3, because the time constant approaches zero. Thereafter, relay coil 24 moves switch 25 into engagement with terminal 26. This connects capacitor 28 in parallel with coil 13.

At a later time $t_4$, a current is induced in coil 13 due to precession of nuclei in the formation adjacent coil 13. This results in damped oscillations being set up in the circuit of coil 13 and capacitor 28. These oscillations are amplified and applied to oscilloscope 33.

In normal operation of the apparatus of this invention, the sequence of events described above is repeated periodically at different depths of the well. To this end, switch 26 is moved back and forth between terminals 19 and 23 by means of a pulser 35. This pulser can be a motor driven cam which performs the desired switching operation. The comparison of the oscillations received by oscilloscope 33 from the different locations can provide valuable information regarding the liquid content of the formations surrounding the well bore, as understood by those skilled in this art.

A double diode 36 is connected in parallel with coil 13. This double diode permits conduction to take place when the voltage applied thereacross exceeds a preselected value. The purpose of this double diode is to prevent current surges from flowing through transistor 16.

In one specific embodiment of this invention, the following circuit components are employed:

| Element: | Value |
| --- | --- |
| 15 | 12 volts. |
| 21 | 3 volts. |
| 13 | 6 millihenries, 2 ohms. |
| 30 | 48 ohms. |
| 17 | 33 ohms. |
| 18 | 130 ohms. |
| 28 | 1.0 microfarad. |
| 16 | TI 2N1022. |
| 36 | Conducts when applied voltage exceeds 44 volts. |

The number of components of FIGURE 2 that are contained in housing 10 for logging operations can be varied, as desired. In many operations, all of the components except oscilloscope 30 are contained in the housing. However, by the use of a camera, even oscilloscope 30 can be in housing 10.

While this invention has been described in conjunction with a presently preferred embodiment, it should be evident that it is not limited thereto.

What is claimed is:

1. Apparatus for use in making nuclear magnetic resonance measurements comprising a coil having one grounded end terminal, a first voltage source, a Zener diode, a capacitor, first switching means to apply said first voltage source across said coil to pass current through said coil when said first switching means is actuated, a second voltage source, second switching means to connect said second voltage source to said first switching means to actuate same when said second switching means is in a first position, time delay switching means to connect said diode in parallel with said coil when said time delay switching means is not actuated and to connect said capacitor in parallel with said coil a preselected time after said time delay switching means is actuated, said diode being connected to said coil so as to discharge said coil to ground when said first voltage source is removed from said coil, means responsive to said second switching means being in a second position to connect said second voltage source to said time delay switching means to actuate same, and measuring means connected across said capacitor to measure the potential thereacross.

2. The apparatus of claim 1, further comprising means to position said second switching means in said first and second positions alternately.

3. The apparatus of claim 1, further comprising a double diode connected in parallel with said coil and a resistor connected in series with said Zener diode.

References Cited by the Examiner

UNITED STATES PATENTS

| 2,914,683 | 11/59 | Terry | 307—88.5 |
| 2,963,619 | 12/60 | Fathauer | 307—88.5 |
| 3,047,742 | 7/62 | Greening et al. | 307—88.5 |
| 3,073,422 | 1/63 | Baumann | 317—148.5 |

FOREIGN PATENTS

| 636,262 | 2/62 | Canada. |
| 864,941 | 4/61 | Great Britain. |

CHESTER L. JUSTUS, *Primary Examiner.*

MAYNARD R. WILBUR, *Examiner.*